(12) United States Patent
Srivastava et al.

(10) Patent No.: US 11,994,646 B2
(45) Date of Patent: May 28, 2024

(54) GARNET SCINTILLATOR COMPOSITIONS FOR DOWNHOLE OIL AND GAS EXPLORATIONS

(71) Applicant: Baker Hughes Oilfield Operations LLC, Houston, TX (US)

(72) Inventors: Alok M. Srivastava, Niskayuna, NY (US); Helene Claire Climent, Houston, TX (US); Holly A. Comanzo, Niskayuna, NY (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 372 days.

(21) Appl. No.: 17/199,989

(22) Filed: Mar. 12, 2021

(65) Prior Publication Data

US 2022/0291414 A1   Sep. 15, 2022

(51) Int. Cl.
| | |
|---|---|
| G01V 5/06 | (2006.01) |
| C09K 11/77 | (2006.01) |
| E21B 47/00 | (2012.01) |
| G01T 1/20 | (2006.01) |

(52) U.S. Cl.
CPC ............ *G01V 5/06* (2013.01); *C09K 11/7774* (2013.01); *E21B 47/00* (2013.01); *G01T 1/2018* (2013.01)

(58) Field of Classification Search
CPC .... C09K 11/7774; G01V 5/06; G01T 1/2018; E21B 47/00
See application file for complete search history.

(56) References Cited

U.S. PATENT DOCUMENTS

| | | | |
|---|---|---|---|
| 5,484,750 A | * 1/1996 | Greskovich | ............. C04B 35/50 501/86 |
| 7,019,284 B2 | 3/2006 | Srivastava | |
| 7,253,129 B2 | * 8/2007 | Takagimi | ............ C04B 35/6455 501/153 |
| 10,087,367 B2 | 10/2018 | Carey | |

(Continued)

FOREIGN PATENT DOCUMENTS

WO   2018/220166   12/2018

OTHER PUBLICATIONS

International Search Report and Written Opinion dated Jun. 29, 2022 in corresponding PCT Application No. PCT/US22/19864.

(Continued)

*Primary Examiner* — C Melissa Koslow
(74) *Attorney, Agent, or Firm* — Hogan Lovells US LLP

(57) ABSTRACT

The use of scintillator compositions having a cubic garnet structure for gamma detection in downhole oil and gas explorations is provided. Specifically, two primary compositions of interest are disclosed, $Ca_2LnHf_2Al_3O_{12}$ and $NaLn_2Hf_2Al_3O_{12}$, where Ln is Y, Gd, Tb, or La. Under gamma ray excitation, the electron-hole pairs produced in the garnet lattice structure are trapped by an activator ion to yield an efficient emission in the visible portion of the electromagnetic spectrum. The cubic garnet structure enables the use of these materials as ceramic scintillators with considerable advantages over related single crystals in various ways as disclosed herein, including reduction in cost and improvement in overall performance and durability.

11 Claims, 5 Drawing Sheets

(56) References Cited

U.S. PATENT DOCUMENTS

| | | | | |
|---|---|---|---|---|
| 11,326,099 B2* | 5/2022 | Srivastava | ............ | C04B 35/46 |
| 2001/0028700 A1* | 10/2001 | Duclos | ............... | C04B 35/6455 |
| | | | | 378/98 |
| 2012/0178193 A1* | 7/2012 | Lei | ...................... | C04B 35/443 |
| | | | | 257/E33.061 |
| 2013/0306874 A1* | 11/2013 | Yoshikawa | ............ | G01T 1/202 |
| | | | | 250/361 R |
| 2016/0138383 A1* | 5/2016 | Molodetsky | ............ | G21K 4/00 |
| | | | | 264/681 |
| 2019/0154220 A1* | 5/2019 | Vincens | ............... | F21S 41/151 |

OTHER PUBLICATIONS

Dorenbos, P et al., "Scintillation Properties of Some Ce 3+ and Pr3+ Doped Inorganic Crystals," Aug. 1993, IEEE Transactions on Nuclear Science, vol. 40, No. 4, p. 388-394.

\* cited by examiner

GARNET SCINTILLATOR COMPOSITIONS FOR DOWNHOLE OIL AND GAS EXPLORATIONS

BACKGROUND

Field

The present disclosure is generally related to scintillator compositions, and more specifically, to the use of scintillator compositions having a garnet structure for downhole oil and gas explorations.

Related Art

In the oil and gas industry, gamma detection may be used to locate and determine possible oil-bearing formations. Downhole nuclear tools may include scintillation detectors, which may include a scintillation crystal and photomultiplier tube (PMT), to detect gamma rays from a formation. In operation, gamma rays emitted from the formation or that have been deflected by the formation are received at the scintillation crystal, which produces optical photons when excited by the gamma rays. The optical photons may be detected by the PMT as a signature of the formation. The signatures acquired from the detected gamma rays may correlate to one or more properties indicative of an oil bearing formation.

SUMMARY OF THE DISCLOSURE

Applicant recognized the problems noted above herein and conceived and developed embodiments of systems and methods, according to the present disclosure, for downhole nuclear detectors, such as gamma ray detectors.

In accordance with an embodiment, a system for detecting gamma radiation in a downhole environment includes a detector positioned in a wellbore extending into a formation. The scintillator is positioned inside the detector, which absorbs the gamma radiation and emits light based on an amount of the gamma radiation present. The scintillator has a cubic garnet structure, and a photomultiplier tube is coupled to the scintillator for amplifying the emitted light and converting the light into an electrical signal. Electronical boards are used to collect the electric signal from the PMT and convert it into counts.

In accordance with an embodiment, a method for detecting gamma radiation in a downhole environment includes positioning a scintillation detector, the scintillation detector comprising a scintillator, in a wellbore extending into a formation, the scintillator having a cubic garnet structure. The method also includes causing interactions between the scintillator and the gamma radiation. The method further includes amplifying photons of light emitted from the scintillator interacting with the gamma radiation. The method includes measuring the emitted light from the scintillator.

In accordance with an embodiment, a method for producing a scintillator for detecting gamma radiation in a downhole environment includes grinding a ceramic powder to a predetermined particle size. The method also includes hot isostatic pressing the powder into a solid ceramic. The method further includes sintering the solid ceramic.

BRIEF DESCRIPTION OF THE DRAWINGS

Various embodiments in accordance with the present disclosure will be described with reference to the drawings, in which.

DETAILED DESCRIPTION

Figure 1:
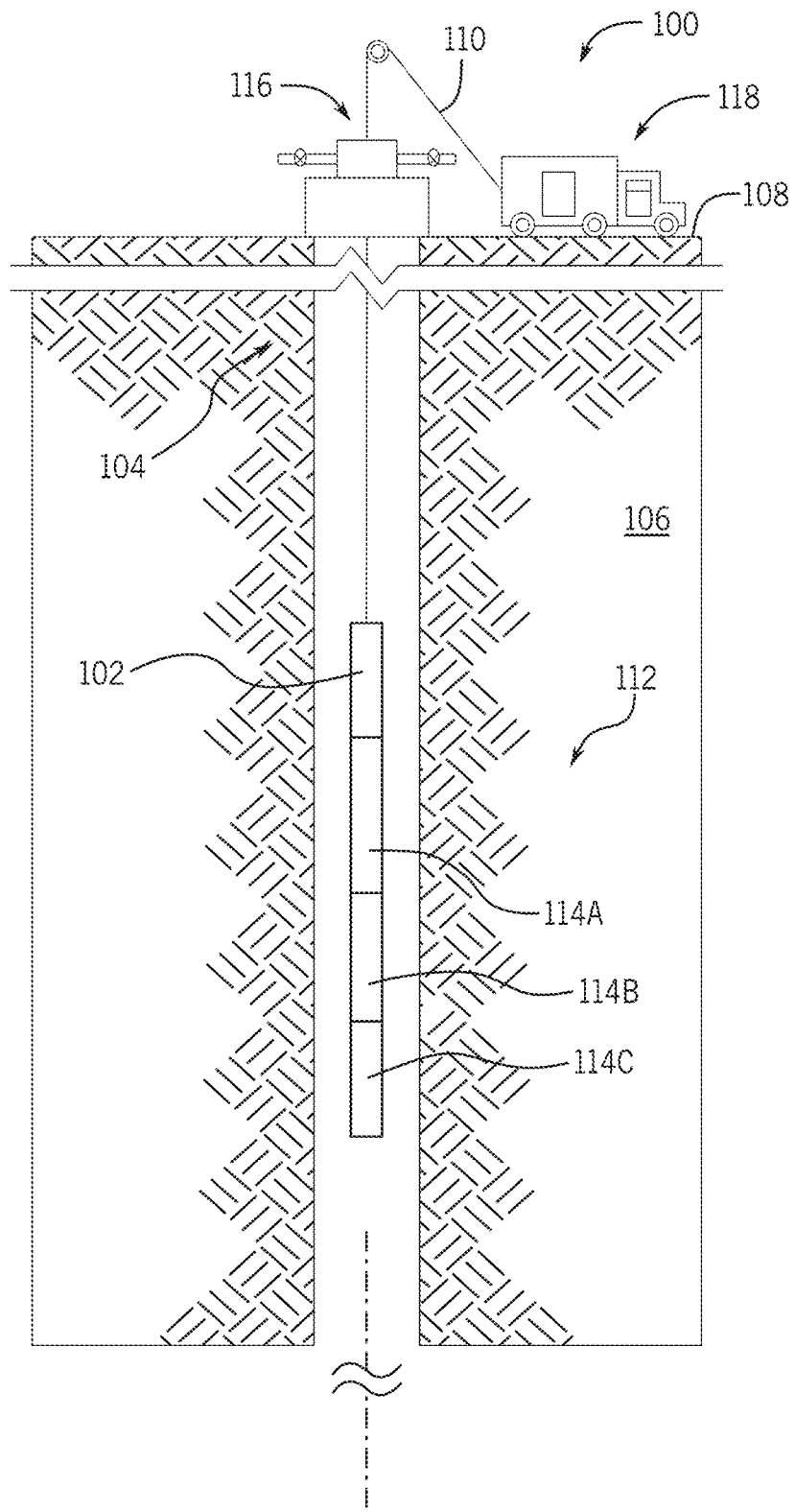
FIG. 1 is a schematic cross sectional view of an embodiment of a wellbore system with a tool, in accordance with various embodiments.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Current downhole scintillators may be comprised of a variety of different materials. One common scintillation material is thallium-doped sodium iodide (NaI(Tl)). This compound has a crystalline structure, but is formed of low atomic number elements, and therefore has a low stopping power for gamma rays. Additionally, NaI(Tl) may suffer from low energy resolution (~7%), and its emission intensity decreases considerably at operational temperatures above 100° C. As a result, NaI(Tl) provides poor characteristics in a downhole environment, where temperatures may be elevated, among other operational challenges.

NaI(Tl) detectors suffer from additional defects. For example, the crystalline structure is delicate and may shatter easily when used in downhole oil and gas explorations due to shock and vibration. This structure for NaI(Tl) may also require extensive time and attention in order to properly grow the crystals. Additionally, NaI(Tl) is hygroscopic, so it absorbs humidity and can break the crystal down into a tinted sludge, thereby making the crystal unusable for scintillation.

Embodiments of the present disclosure are directed toward overcoming problems with current scintillation detectors, such as NaI(Tl) detectors. In various embodiments, scintillation materials are described that exhibit high energy resolution. High energy resolution may be considered energy resolution which is around 7 percent (7%), however, it should be appreciated that other energy resolutions may also be considered high energy resolutions. Furthermore, embodiments may provide a high light yield at operational temperatures within the range of approximately 150° C. to 200° C., and more specifically between 175° C. to 200° C. In various embodiments, high light yield may be considered between approximately 9,000 photons/MeV and approximately 40,000 photons/MeV. Additionally, the scintillator material of the present disclosure is able to withstand shock and vibration associated with downhole operations.

Embodiments of the present disclosure address garnet-based scintillators, that is, scintillators formed with a garnet-based structure. These scintillators may provide improvements in energy resolution and light yield relative to NaI(Tl), among other scintillation crystals, at elevated temperatures. Further, these compositions may advantageously be fabricated into transparent ceramic scintillators via the process of hot isostatic processing (HIP), which is considerably less expensive than growing single crystals, such as those associated with NaI(Tl). Additionally, these ceramic structures are more stable in application, are easily transportable compared to other scintillators, and are not hygroscopic.

Embodiments of the present disclosure include a system for detecting gamma radiation in a downhole environment. This system may comprise a detector positioned in a wellbore extending into a formation, such as an oil-bearing formation. A scintillator, such as a scintillator having a cubic garnet structure, may be positioned inside the detector to absorb gamma radiation, which may be radiating from the formation, and emit light based on an amount of the gamma radiation present. A photomultiplier tube (PMT) or other similar technology may be coupled to the scintillator to amplify the emitted light and convert it into an electronic signal for measurement. Additionally, electronics are coupled to the PMT to measure and/or acquire the signal, power the PMT, and the like. According to one embodiment, the scintillator is comprised of $NaLn_2Hf_2Al_3O_{12}$, wherein Ln is one of Yttrium (Y), Gadolinium (Gd), Terbium (Tb), or Lanthanum (La). Alternatively, the scintillator may be comprised of $Ca_2LnHf_2Al_3O_{12}$, wherein Ln is one of Y, Gd, Tb, or La. Further, in various embodiments, the scintillator according to either of the above embodiments may be activated by Cerium (e.g., $Ce^{3+}$).

Additionally, the scintillator may be a transparent ceramic having a cubic garnet structure. This ceramic may be formed by grinding a ceramic powder comprising $NaLn_2Hf_2Al_3O_{12}$ or $Ca_2LnHf_2Al_3O_{12}$ to a particle size of 1-10 microns, hot isostatic pressing the powder into a solid ceramic, and sintering the solid ceramic. As noted above, the cubic garnet structure may provide a variety of benefits to the scintillator, such as application stability for downhole operations, easy transportability due to a more robust structure, and improved downhole characteristics due to being not hygroscopic. In various embodiments, a cubic garnet structure may describe a structure with a cubic symmetry having three axes that are all of equal length perpendicular to each other. However, it should be appreciated that the garnet structure may further refer to structures that include divalent cations and trivalent cations in an octahedral/tetrahedral framework.

Further, embodiments describe a method for detecting gamma radiation in a downhole environment. A scintillation detector may be positioned in a wellbore extending into a formation. This scintillation detector may house a scintillator, and more specifically, a ceramic garnet composition. The scintillator interacts with and absorbs gamma radiation present in the wellbore. As explained herein, the scintillator may interact with and capture gamma radiation because of the chemical composition of the scintillator. Photons of light emitted from the scintillator interacting with the gamma radiation may be amplified using various techniques, such as a PMT. This step converts the light emitted from the scintillator into an electric signal. This electric signal may then be measured. As explained herein, the measuring electronic is directly coupled to the PMT. The measured data are stored in the downhole memory but may also be sent uphole for real-time processing. At the surface, the data acquisition system may take the form of a computing device such as a laptop, smartphone, or other type of computing device comprising a processor and memory.

As explained above, sodium-based crystals are commonly used in scintillation detectors to detect gamma rays in order to find oil-bearing formations. However, these crystals do not perform well for detection at high temperatures, which are common in wellbores, and in the presence of vibrations from oil and gas operations (e.g., logging while drilling, tripping into a well, transportation to the site, etc.). Accordingly, poor performance and damage to the crystals, such as shattering, may occur when using traditional sodium-based scintillators. Thus, embodiments of the present disclosure described herein address these problems associated with using sodium-based crystals for scintillation.

FIG. 1 is a schematic side view of an embodiment of a wellbore system 100 that includes a tool 102 (which may be part of a tool string) being lowered into a wellbore 104 formed in a formation 106 from a surface location 108. The illustrated wellbore system 100 may be referred to as a wireline system because the tool 102 is conveyed on a cable 110, such as an electric wireline although this analysis system could also be deployed on a drill string for measuring or logging while drilling. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, and may be an imaging tool, a resistivity tool, a nuclear tool, or any other logging tool that may be used in a downhole environment. However, for the purposes of the present disclosure, the tool 102 will be described as a nuclear tool for identifying oil-bearing formations.

As described above, in various embodiments the tool 102 may be part of a tool string 112, which may include various components utilized for wellbore operations. For example, the tool string 112 may include various other tools 114A-114C that may include sensors, measurement devices, communication devices, and the like, which will not all be described for clarity. In various embodiments, the tool string 112 may include one or more tools to enable at least one of a logging operation, a perforating operation, or a well intervention. For example, nuclear logging tools, fluid sampling tools, core sampling devices, and the like may be utilized in logging operations. Perforating operations may include ballistic devices being lowered into the wellbore to perforate casing or the formation. Furthermore, well interventions may include operations related to analyzing one or more features of the wellbore and proceeding with performing one or more tasks in response to those features, such as a data acquisition process, a cutting process, a cleaning process, and the like. Accordingly, in various embodiments, the tool string 112 may refer to tools that are lowered into the wellbore. Additionally, passive devices such as centralizers or stabilizers, tractors to facilitate movement of the tool string 112 and the like may also be incorporated into the tool string 112.

In various embodiments, different power and/or data conducting tools may be utilized by embodiments of the present disclosure in order to send and receive signals and/or electrical power. As will be described below, in various embodiments sensors may be incorporated into various components of the tool string 112 and may communicate with the surface or other tool string components, for example via communication through the cable 110, mud pulse telemetry, wireless communications, wired drill pipe, and the like. Furthermore, it should be appreciated that while various embodiments include a wireline system, in other embodiments rigid drill pipe, coiled tubing, or any other downhole exploration and production methods may be utilized with embodiments of the present disclosure.

The wellbore system 100 includes a wellhead assembly 116 shown at an opening of the wellbore 104 to provide pressure control of the wellbore and allow for passage of equipment into the wellbore 104, such as the cable 110 and the tool string 112. In this example, the cable 110 is a wireline being spooled from a service truck 118. The illustrated cable 110 extends down to the end of the tool string 112. In operation, the cable 110 may be provided with slack as the tool string 112 is lowered into the wellbore 104, for example to a predetermined depth. In various embodiments, a fluid may be delivered into the wellbore 104 to drive movement of the tool string 112, for example where gravity may not be sufficient, such as in a deviated wellbore. For example, a fluid pumping system (not illustrated) at the surface may pump a fluid from a source into the wellbore 104 via a supply line or conduit. To control the rate of travel of the downhole assembly, tension on the wireline 110 is controlled at a winch on the surface, which may be part of the service tuck 118. Thus, the combination of the fluid flow rate and the tension on the wireline may contribute to the travel rate or rate of penetration of the tool string 112 into the wellbore 104. The cable 110 may be an armored cable that includes conductors for supplying electrical energy (power) to downhole devices and communication links for providing two-way communication between the downhole tool and surface devices. Moreover, in various embodiments, tools such as tractors and the like may further be disposed along the tool string 112 to facilitate movement of the tool string 112 into the wellbore 104. Thereafter, in various embodiments, the tool string 112 may be retrieved from the wellbore 14 by reeling the cable 110 upwards via the service truck 118. In this manner, logging operations may be performed as the tool string 112 is brought to the surface 108.

In the embodiment illustrated in FIG. 1, the tool 102 may include a scintillation detector for identifying oil-bearing formations. As explained above, the scintillation detector is used to generate signatures for determining variations in naturally-occurring gamma radiation inside the wellbore 104 or radiation emitted from a chemical source embarked in the tool that is back-scattered by the formation. In various embodiments, a scintillation crystal composed of NaI(Tl) is used. However, as also explained above, this composition is not stable if exposed to humidity or reliable for several reasons. Thus, embodiments of the present disclosure overcome various problems experienced with previous methods while also providing greater sensitivity to the analysis and simpler manufacturing.

Figure 2:
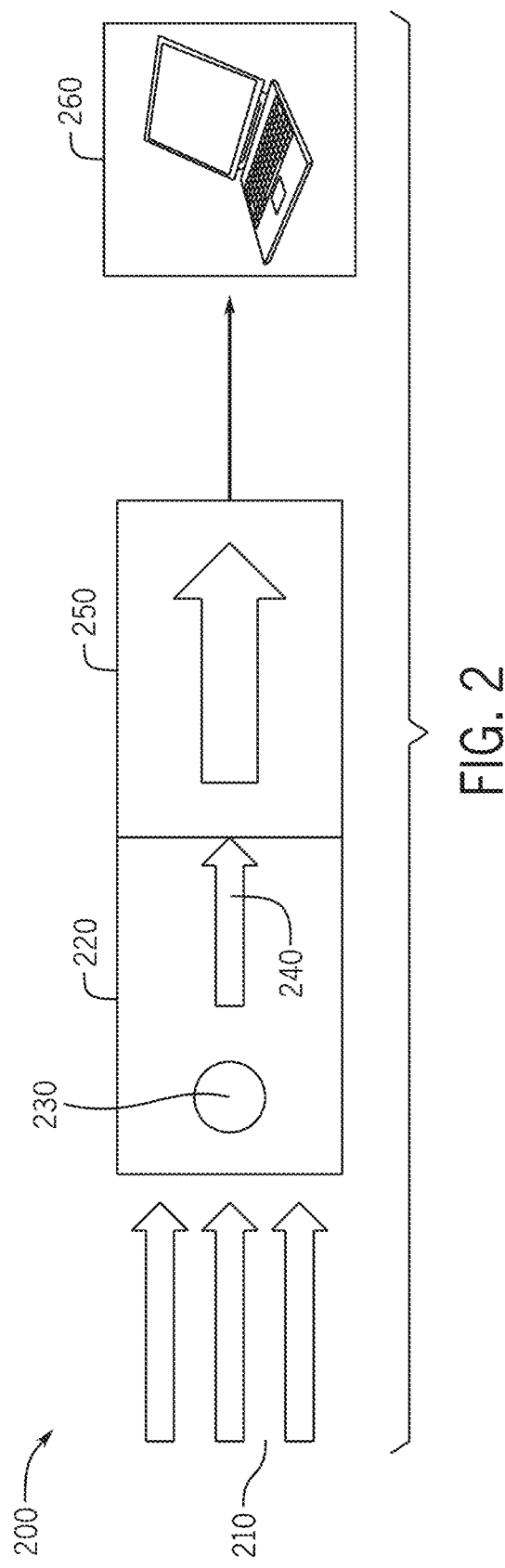
FIG. 2 is a schematic diagram of an embodiment of a scintillation system, in accordance with various embodiments.

FIG. 2 shows a scintillation system 200 according to an example embodiment. In operation, gamma radiation 210 is emitted from and/or back-scattered by the formation and interacts with the scintillation detector 220. In various embodiments, gamma radiation may be naturally occurring radiation, back-scattered gamma rays, or the like. It should be appreciated that systems and methods of the present disclosure may be used with any type of gamma ray or x-ray detection. Within the detector 220, a scintillation material 230 (e.g., scintillation crystal), which in this embodiment is a ceramic garnet composition, may be positioned such that the gamma radiation 210 can be absorbed by the scintillation material 230. As noted above, the ceramic garnet composition may be comprised of $Ca_2GdHf_2Al_3O_{12}$ or $NaLn_2Hf_2Al_3O_{12}$, where Ln is one of Y, Gd, Tb, or La (Yttrium, Gadolinium, Terbium, or Lanthanum, respectively).

In various embodiments, the composition comprising $NaLn_2Hf_2Al_3O_{12}$ may produce a higher light yield, which is likely attributable to achieving a more pure single phase from improved sintering.

Additionally, regarding Ln, while any of these elements may be used in the garnet composition based on desired functionalities, Gd provides for a higher stopping power over Y. Additionally, components such as Lutetium (Lu) exhibit radioactivity in one of its isotopes, and as a result, may be undesirable for detecting gamma radiation. However, a measuring device may be calibrated to adjust emission results based on the expected or measured radioactivity in Lu. Further, Gd helps to increase density (and thereby provide better stopping power).

Either of these scintillation materials 230 may be activated by Ce', which may help prolong the emission time and help detect the emitted light more accurately.

There are several advantages to utilizing $Ca_2GdHf_2Al_3O_{12}$ or $NaLn_2Hf_2Al_3O_{12}$ over NaI(Tl), as well as other common scintillator crystals. For example, these compositions produce a higher light yield and better energy resolution over NaI(Tl), especially at elevated temperatures, which are often present during downhole oil and gas operations. Additionally, these compositions have a higher stopping power than NaI(Tl), and have a faster rate of decay of around 40-60 ns, compared to 250 ns for NaI(Tl). Further, the cubic structure of the garnet is easier to create than the delicate crystalline structure of NaI(Tl), which may reduce manufacturing costs. The garnet itself is cheaper to manufacture and process due to being more durable than NaI(Tl) and also because of other properties such as being less hygroscopic than NaI(Tl). Accordingly, use of the scintillation material of the present disclosure may overcome problems associated with NaI(Tl) detectors while also reducing manufacturing costs.

Once the ceramic garnet composition 230 absorbs the gamma radiation 210, the ceramic garnet composition 230 may emit light photons 240. Under gamma ray excitation, the electron-hole pairs produced in the garnet lattice structure of the ceramic garnet composition 230 are trapped by the activator ion Ce' to yield an efficient emission in the visible portion of the electromagnetic spectrum. The cubic garnet structure enables the use of these materials as ceramic scintillators with considerable advantages over related single crystals in various ways as disclosed herein, including reduction in cost and improvement in overall performance and durability.

Directly coupled to the scintillation material 220 may be a photomultiplier tube (PMT) 250. As is commonly known to one in the art, standard PMTs serve to absorb the emitted light photons 240 to emit electrons (not shown), and amplify the electrons for detection. However, any other type of light-sensitive device may be used to amplify the electrons for detection instead of the PMT 250.

Connected to the PMT 250 may be a set of electronics including a power source (not shown) and a measuring device 260 for recording the overall excitation and emission of the ceramic garnet composition 230. This measuring device may be coupled via wire or wirelessly, and may be any type of computing device with a processor and memory.

The ceramic garnet composition 230 may be manufactured by grinding the raw composition into a powder with particle sizes between 1-10 microns. Then, the powder can be subjected to the process of hot isostatic pressing (HIP) in order to produce a solid ceramic. Either simultaneous to the HIP process or sequentially after, the solid ceramic may be subjected to sintering to remove excess water. In this way, a transparent ceramic can be produced.

Figure 3:
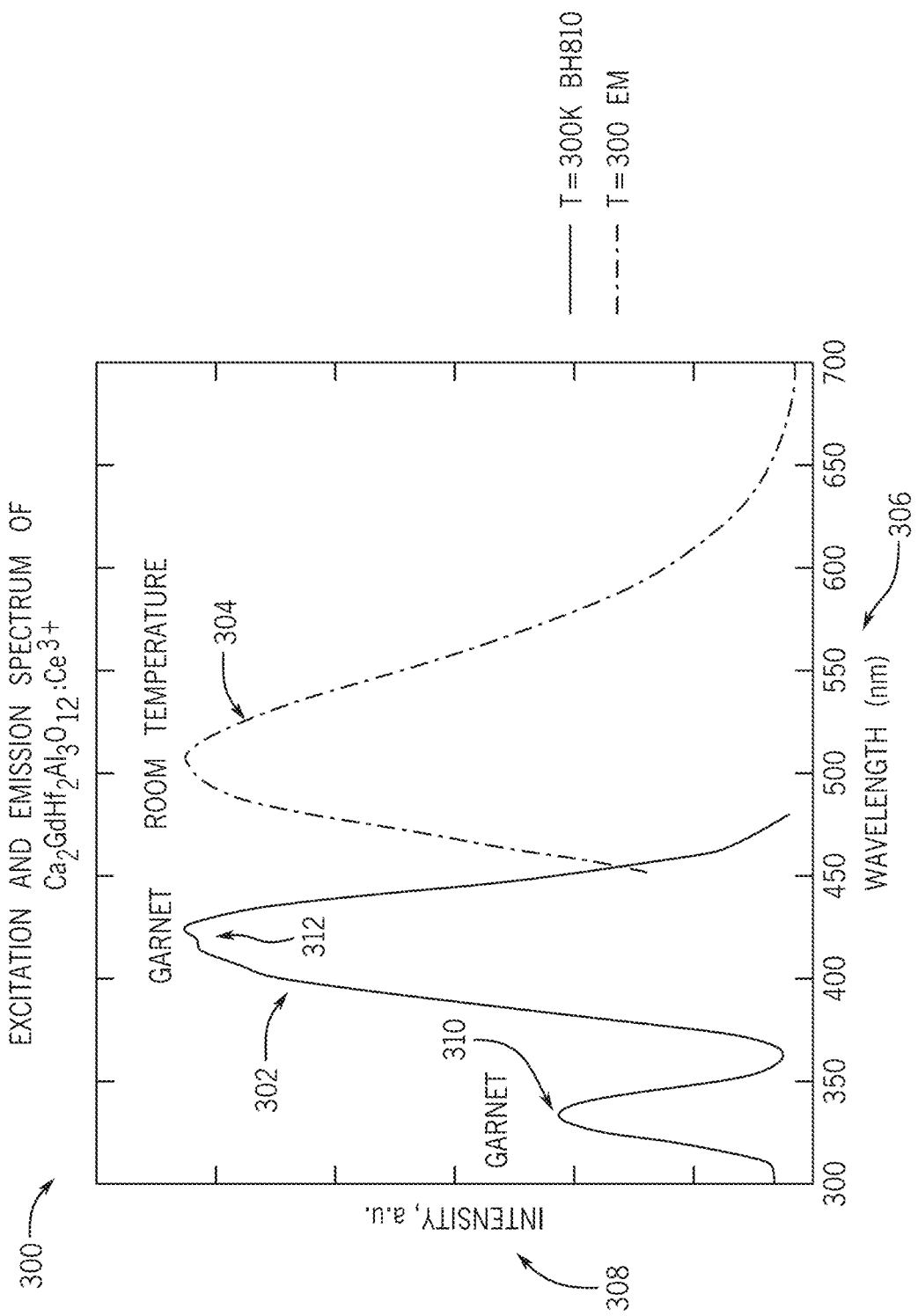
FIG. 3 is a graphical representation of an excitation and emission spectrum, in accordance with various embodiments.

FIG. 3 is a graphical representation of excitation and emission spectra for $Ca_2GdHf_2Al_3O_{12}$. Specifically, FIG. 3 illustrates a representation 300 for respective spectra 302, 304 corresponding to a scintillation material of $Ca_2GdHf_2Al_3O_{12}$. In this embodiment, the spectrum 302 corresponds to excitation while the spectrum 304 corresponds to emission. The x-axis 306 represents wavelength (nm) and the y-axis 308 represents intensity (au). Each of the spectra is illustrated at 300K.

It is known that as temperatures increase, the properties of scintillators (light output, resolution, etc.) decreases. Thus, at higher temperatures such as operational temperatures in downhole explorations, the light output for NaI may decrease below a desirable level, thereby upsetting operations. Embodiments of the present disclosure may utilize scintillators formed from $Ca_2GdHf_2Al_3O_{12}$ or $NaLn_2Hf_2Al_3O_{12}$ to overcome the deficiencies of existing tools. In the embodiment illustrated in FIG. 3, the scintillator illustrates an emission peak in spectrum 304 at ~500 nm. Also shown is the excitation spectrum 302 that exhibits two peaks 310 and 312 centered at ~325 nm and 425 nm, respectively. Accordingly, embodiments of the present disclosure may be formulated to be operable with existing PMTs, thereby increasing use within the field and allowing for crystals to be interchanged to obtain different operational responses. It should be appreciated that various embodiments for $NaLn_2Hf_2Al_3O_{12}$ may provide similar desirable intensities within a desirable wavelength range and that the graphical representation of $Ca_2GdHf_2Al_3O_{12}$ is shown as illustrative and not intended to limit the scope of the present disclosure.

Figure 4:
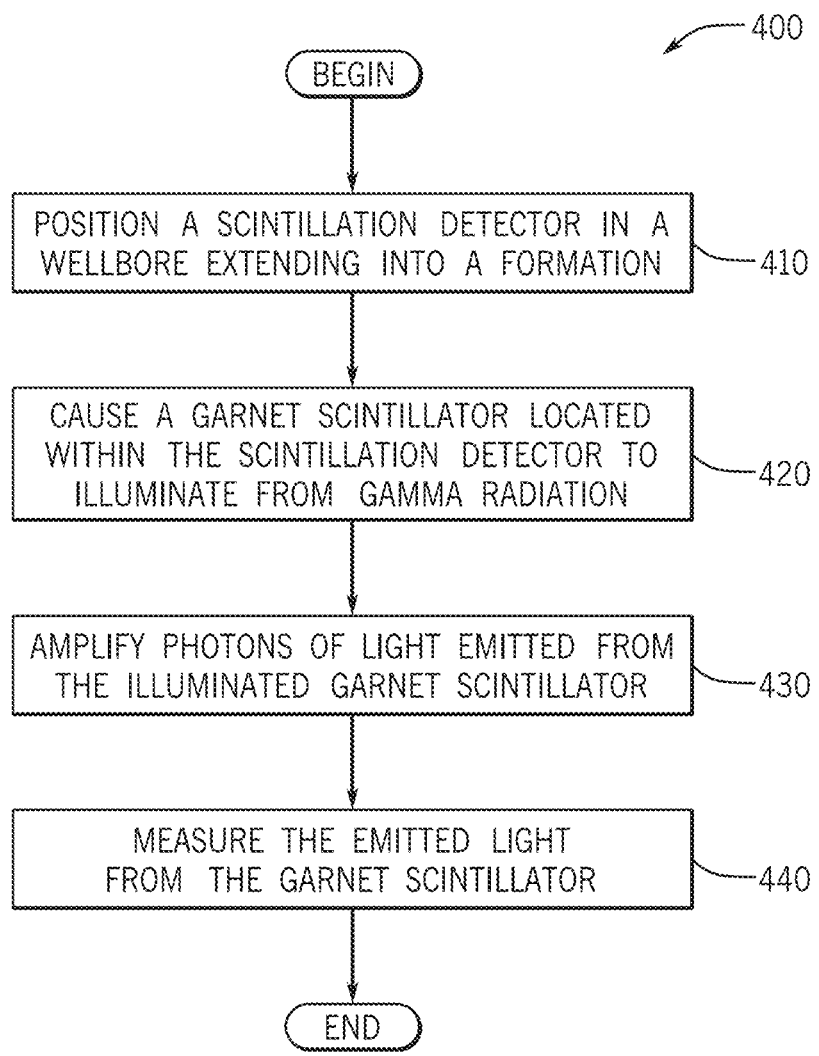
FIG. 4 is a flow chart of an embodiment of a method for detecting gamma radiation in a downhole environment, in accordance with various embodiments.

FIG. 4 is a flow chart for a method 400 for detecting gamma radiation in a downhole environment according to an example embodiment. It should be appreciated for this method, and all methods described herein, that the steps may be performed in a different order, or in parallel, unless otherwise stated. Furthermore, the method may include more or fewer steps. In this example, a scintillation detector may be positioned in a wellbore extending into a formation 410. The scintillation detector may house a scintillator, such as the ceramic garnet composition 230 shown in FIG. 2. In various embodiments, the scintillation detector is part of a downhole tool arranged on a tool string. As noted above, the downhole tool may be arranged proximate the formation to detect naturally occurring or back-scattered gammas, among other options.

The scintillator may capture the gamma radiation from interactions between the gamma radiation and the scintillator 420. Because of the chemical composition of the scintillator, the scintillator may illuminate in the presence of gamma radiation.

Photons of light emitted from the illuminated scintillator may be amplified using various techniques, such as a photomultiplier tube (PMT) 430. The PMT measures the light emitting from the scintillator as well as converts the photons into electrons to generate an electric signal.

This emitted signal is then measured 440. As explained in other parts of this disclosure, the measuring device is directly coupled to the photomultiplier tube, and may take the form of an electronic board comprising a processor and memory.

Figure 5:
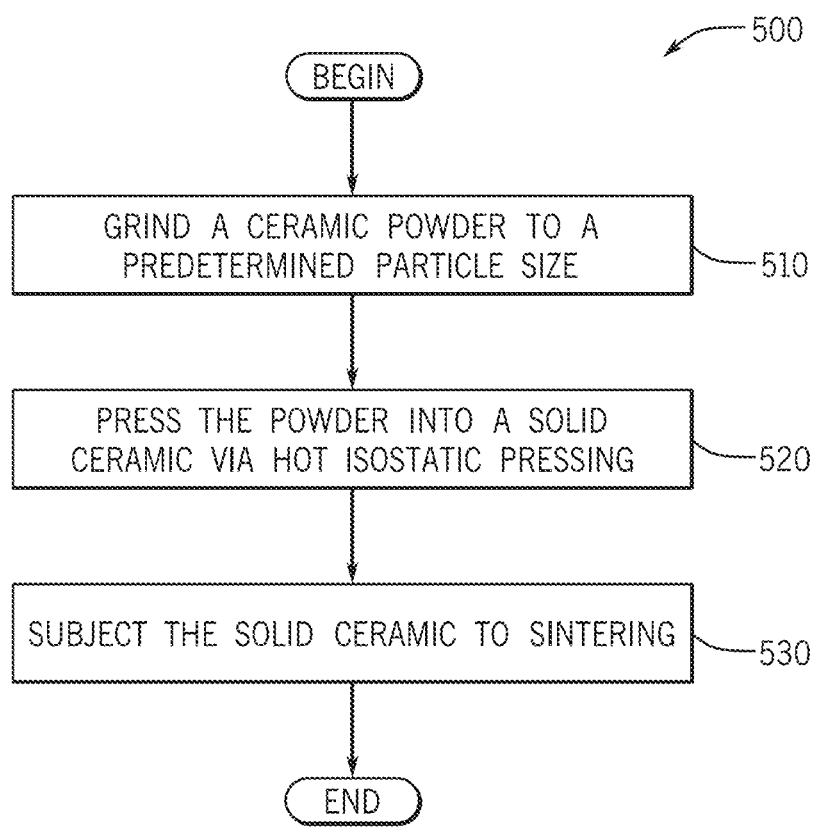
FIG. 5 is a flow chart of an embodiment of a method for creating a scintillator having a cubic garnet structure in accordance with various embodiments.

FIG. 5 shows a flow chart for an embodiment of a method 500 for producing a scintillator for detecting gamma radiation in a downhole environment. In this method 500, a ceramic powder is ground to a predetermined particle size 510. This particle size may be between 1-10 microns. The powder is then pressed into a solid ceramic via hot isostatic pressing 520. The solid ceramic is then sintered to remove excess moisture 530.

In various embodiments, various instrumentation units and data collection units may be utilized that may include a digital and/or an analog system. For example, the tool 102 may include and/or be coupled to digital and/or analog systems. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure.

Additionally, the various techniques described herein are not restricted to use in downhole oil and gas explorations, and may be applied to other embodiments directed to gamma radiation detection, such as the healthcare industry, homeland security, and industrial inspection.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

What is claimed is:

1. A system for detecting gamma radiation in a downhole environment, the system comprising:
    a detector positioned in a wellbore extending into a formation;
    a scintillator positioned inside the detector which absorbs the gamma radiation and emits light based on an amount of the gamma radiation present, the scintillator having a cubic garnet structure and being formed from a grinding, a hot isostatic pressing, and a sintering process, the sintering process following the hot isostatic pressing, in which a ceramic powder with a particle size of 1-10 microns is used in the hot isostatic pressing, wherein the scintillator is comprised of $NaLn_2Hf_2Al_3O_{12}$ and Ln is one of Y, Gd, Tb, or La;
    a photomultiplier tube coupled to the scintillator for amplifying the emitted light; and
    a measuring device coupled to the photomultiplier tube for measuring an amount of electrons in the emitted light.

2. The system of claim 1, wherein the scintillator is a transparent ceramic.

3. A method for detecting gamma radiation in a downhole environment, the method comprising:
    grinding a ceramic powder to a particle size of 1-10 microns;
    hot isostatic pressing the powder into a solid ceramic;
    sintering the solid ceramic;
    forming a scintillation detector, comprising a scintillator including the solid ceramic, the solid ceramic being transparent and having a cubic garnet structure;
    positioning the scintillation detector in a wellbore extending into a formation;
    causing an interaction between the scintillator and the gamma radiation;
    amplifying photons of light emitted from the scintillator responsive to the interaction between the scintillator and the gamma radiation; and
    measuring an amount of photons in the emitted light from the scintillator.

4. The method according to claim 3, wherein the scintillator is comprised of $NaLn_2Hf_2Al_3O_{12}$ and Ln is one of Y, Gd, Tb, or La.

5. The method according to claim 3, wherein the scintillator is comprised of $Ca_2LnHf_2Al_3O_{12}$ and Ln is one of Y, Gd, Tb, or La.

6. A method for producing a scintillator for detecting gamma radiation in a downhole environment, the method comprising:
    grinding a ceramic powder to a particle size of 1-10 microns;
    hot isostatic pressing the powder into a solid ceramic; and
    sintering the solid ceramic.

7. The method according to claim 6, wherein the scintillator is comprised of $NaLn_2Hf_2Al_3O_{12}$ and Ln is one of Y, Gd, Tb, or La.

8. The method according to claim 6, wherein the scintillator is comprised of $Ca_2LnHf_2Al_3O_{12}$ and Ln is one of Y, Gd, Tb, or La.

9. The method according to claim 6, wherein the solid ceramic is transparent and has a cubic garnet structure.

10. A system for detecting gamma radiation in a downhole environment, the system comprising:
    a detector positioned in a wellbore extending into a formation;
    a scintillator positioned inside the detector which absorbs the gamma radiation and emits light based on an amount of the gamma radiation present, the scintillator having a cubic garnet structure and being formed from a grinding, a hot isostatic pressing, and a sintering process, the sintering process following the hot isostatic pressing, in which a ceramic powder with a particle size of 1-10 microns is used in the hot isostatic pressing, wherein the scintillator is comprised of $Ca_2LnHf_2Al_3O_{12}$ and Ln is one of Y, Gd, Tb, or La;
    a photomultiplier tube coupled to the scintillator for amplifying the emitted light; and
    a measuring device coupled to the photomultiplier tube for measuring an amount of electrons in the emitted light.

11. The system of claim 10, wherein the scintillator is a transparent ceramic.

* * * * *